2,686,479

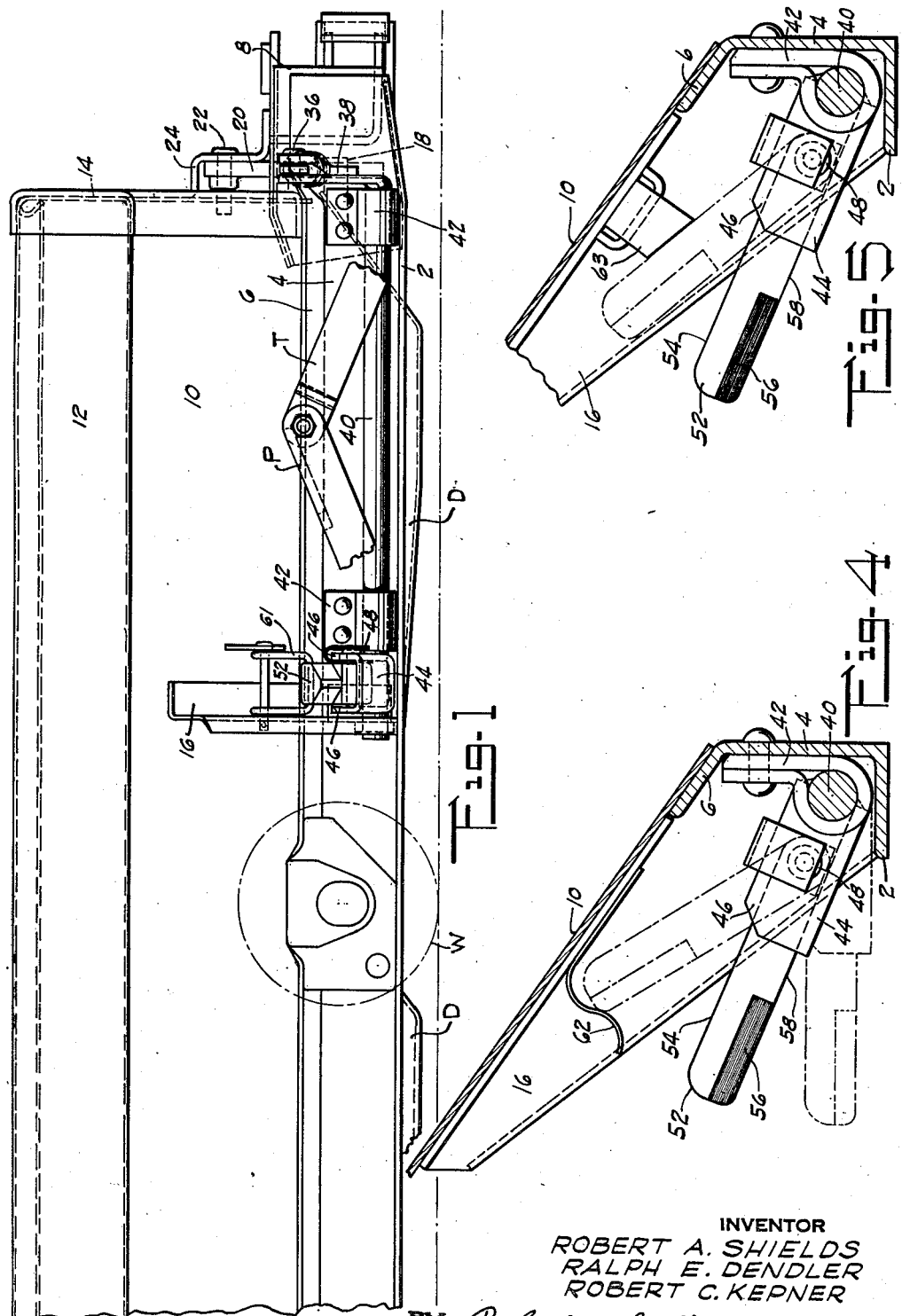
Aug. 17, 1954 — R. A. SHIELDS ET AL — 2,686,479
DOWN PRESSURE LATCH TRIPPING CAR
Filed July 12, 1951 — 3 Sheets-Sheet 1
INVENTOR
ROBERT A. SHIELDS
RALPH E. DENDLER
ROBERT C. KEPNER
BY Robert A. Shields ATTORNEY Aug. 17, 1954
R. A. SHIELDS ET AL
2,686,479
DOWN PRESSURE LATCH TRIPPING CAR
Filed July 12, 1951
3 Sheets-Sheet 2
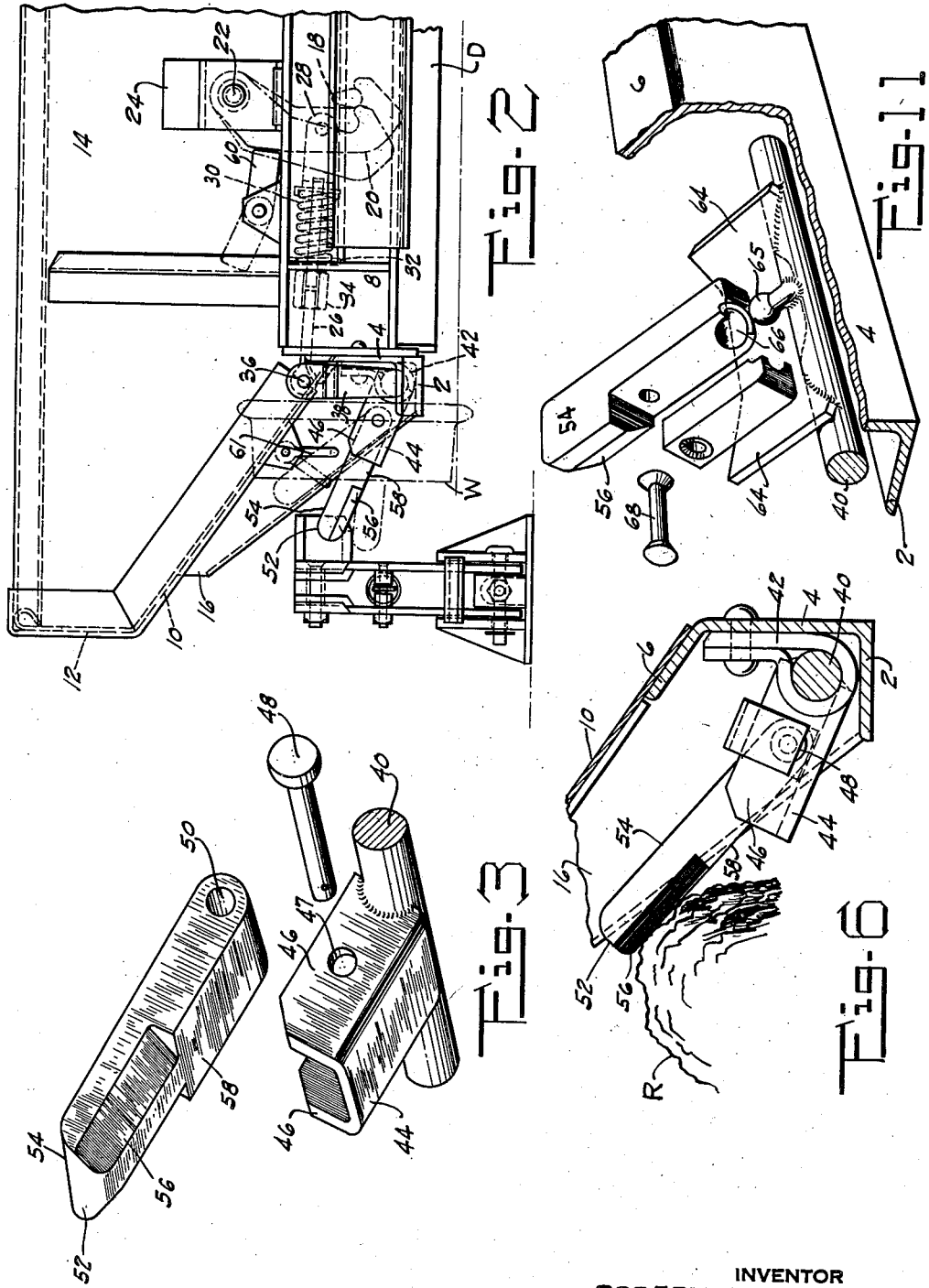
INVENTOR
ROBERT A. SHIELDS
RALPH E. DENDLER
ROBERT C. KEPNER
BY Robert A. Shields ATTORNEY Aug. 17, 1954   R. A. SHIELDS ET AL   2,686,479
DOWN PRESSURE LATCH TRIPPING CAR
Filed July 12, 1951   3 Sheets-Sheet 3
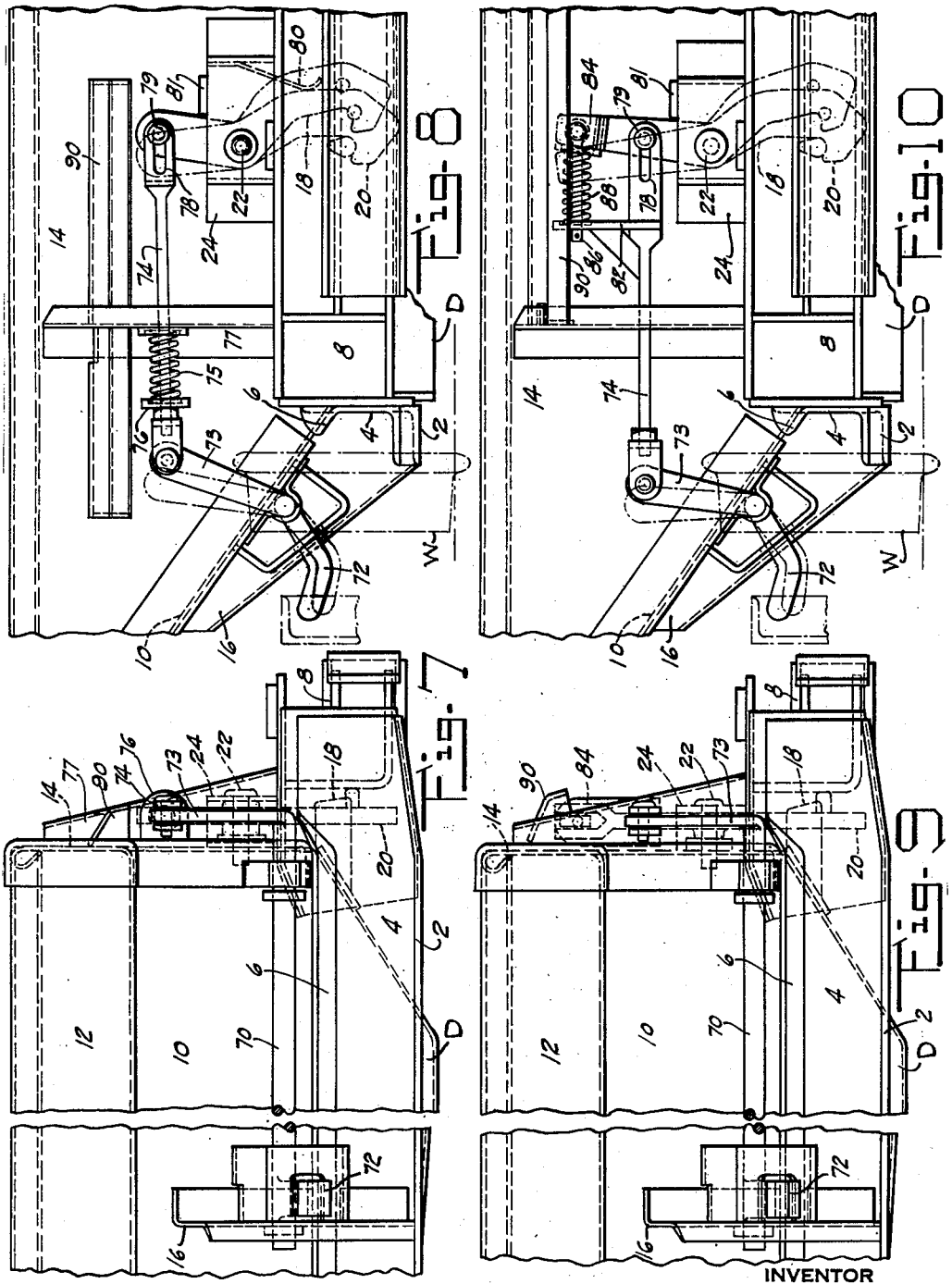
INVENTOR
ROBERT A. SHIELDS
RALPH E. DENDLER
ROBERT C. KEPNER
BY Robert A. Shields ATTORNEY Patented Aug. 17, 1954

UNITED STATES PATENT OFFICE 2,686,479

DOWN PRESSURE LATCH TRIPPING CAR

Robert A. Shields, Bloomsburg, Ralph E. Dendler, Berwick, and Robert C. Kepner, Bloomsburg, Pa., assignors to ACF Industries, Incorporated, a corporation of New Jersey Application July 12, 1951, Serial No. 236,426

29 Claims. (Cl. 105—286)

This invention relates to mine cars in general, but in particular to mine or industrial cars having drop bottom doors adapted to be automatically tripped at designated points.

Mine or other industrial cars have for years been tripped at the dumping stations by means of trackside ramps and car-carried latch arms projecting to the side of the car and riding upwardly over the ramp to unlatch the doors. In order for these arms to contact the tripping ramp, it is necessary that they project beyond the contours of the car with the result that accidental tripping may occur during transit through the mines by the arms contacting trackside obstructions such as fallen rocks, coal, etc. Recently, attempts have been made to protect the latch tripping mechanism by placing the same beneath the car, but all of these devices are tripped by pressure exerted in an upward or rearward direction, that is, in a direction such that any trackside obstacle could trip the latch during movement of the car. It is an object, therefore, of the present invention to provide a latch control mechanism, the operating part of which moves in a direction opposite to the pressure that any normal trackside obstruction could exert.

A further object of the invention is the provision of a car with latch mechanism having all parts thereof either fully protected by the car structure or yieldable to prevent damage by trackside obstructions.

A still further object of the invention is the provision of a car with latch mechanism including a trip lever located adjacent to a wheel for protection thereby and to provide better cooperation between the trip lever and a trackside tripper throughout the life of the car.

A yet further object of the invention is the provision of a car having latch mechanism including a lost motion connection between the trip lever and the door retaining member.

Yet another object of the invention is the provision of a car having latch mechanism including a trip lever which may be rendered operative or held inoperative in a position within the confines of the car.

These and other objects of the invention will be apparent to persons skilled in the art from a study of the following description and accompanying drawings, in which Fig. 1 is an elevational view of substantially one-half the car;

Fig. 2 is an end view of substantially one-half of the rear end of the car and showing the relation of the car to the trackside tripper;

Fig. 3 is an exploded perspective view of one form of the lost motion connection;

Fig. 4 is a sectional view taken adjacent the trip lever and showing one form of lever retaining means;

Fig. 5 is a sectional view similar to Fig. 4, but showing a further modification of the lever retaining means;

Fig. 6 is a sectional view showing the action of the parts upon contact with a trackside obstruction;

Figs. 7 and 8 are elevational and end views respectively of a modified form of latch mechanism;

Figs. 9 and 10 are side and end views respectively of a still further modified form of latch mechanism; and Fig. 11 is an exploded perspective view disclosing a modified form of latch tripping lever.

Referring now to the drawings in detail it will be seen that the car body is supported on wheel W through axles and journal boxes (not shown). The car side sills are formed with an outstanding horizontal flange 2 and upstanding web 4, and an upwardly and outwardly inclined top flange 6. These side sills are spaced, as is customary, and are joined by end sill structures 8, thereby enclosing a space adapted to be closed by one or more drop bottom doors D. Upwardly and outwardly sloping side floors or wings 10 are attached to the upwardly sloping flanges 6, and the side walls terminate in an upwardly directed side wall 12. The side walls are connected at their ends by end walls 14, which in turn are connected to the end sill structures. To prevent any sagging of the side walls 10, they are suitably gusseted by gusset 16 attached to the sloping floor portions and to the sill flanges and web. The rearmost door D is provided with a latch tongue 18 adapted to normally rest on a ledge formed on the lower end of latch hook 20 pivoted, as at 22, to the end wall and to a supporting structure 24 fastened to the end wall and to the end sill structure.

In the form shown by Figs. 1 to 6 and 11, the latch hook 20 is operated by means of a pull rod connection 26. The inner end of this connection is formed with a clevis jaw pin connected, as at 28, to the hook and extending through a spring 30 bearing at one end on the clevis jaw and at the other end upon a stop 32, welded or otherwise secured to the end sill structure. As clearly shown, the pull rod is made in two parts, joined by a turnbuckle 34, adapted to bear upon the stop 32, thereby permitting adjustment of the hook position with respect to the lug 18. In other words, the turnbuckle 34 will act as a stop limiting the counterclockwise rotation of the hook, and holding the same in its proper position, both when the door is open and when it is closed. The outer end of the pull rod connection 26 is pin connected, as at 36, to bell crank 38 formed on a rock shaft 40. This rock shaft extends longitudinally of the car and is held in its position between flange 2 and web 4 by bearing straps 42. The forward end of the rock shaft, as clearly shown in Fig. 1, also projects through, and has bearing in, the gusset 16. In order to cause motion of the rock shaft, a U-shaped member 44 is welded or otherwise secured to the rock shaft and has the upstanding flanges 46 pierced, as at 47, to receive a pin 48 adapted to extend through the flanges and through a hole 50 in the inner end of trip lever 52. This trip lever, as most clearly shown in Fig. 3, is formed with a flat top surface 54 and adjacent its outer end with inclined surfaces 56. Inwardly of these inclined surfaces the lever is formed with a flat surface 58 adapted to bear upon the web of the U-shaped member 44. Under certain conditions men are carried in the cars, and under these circumstances it is advisable to provide a positive lock in the form of a dog 60, carried by the end sill structure and adapted to be thrown into the path of movement of hook 20, thereby positively preventing any accidental tripping of the doors.

From the preceding it will be seen that the latch mechanism is fully protected by the car parts and that the position of the parts can be adjusted by turning the pull connection parts in the turnbuckle 34, that is, the position of the hook may be adjusted by turning the inner part, and the position of the bell crank and its connected parts can be controlled by turning the outer part of the connection in the turnbuckle. It will be seen that the rigid part 44 has only a small portion projecting past the contour of the car, as defined by the gusset 16, and this portion is fully protected during the normal forward motion of the car by the wheel W. The trip lever 52, which of necessity projects beyond the confines of the car, is of great strength longitudinally of the car to resist longitudinal shocks, and is provided with the inclined surfaces 56 adapted to ride up over a trackside obstruction, such as a rock R (Fig. 6). This upward motion of the trip lever has no effect on the latch, since the trip lever freely pivots around its pin 48. When the car reaches the dumping station, the lever 52 is adapted to contact a downwardly sloping projection P formed on and carried by a collapsible tripper T. This downwardly sloping projection will pull the trip lever downwardly, and since it is held by the pivot pin 48 and the inter-engagement of its flat surface 58 with the web of 44, it will cause a counterclockwise rotation of rock shaft 40, thereby pulling the hook out of engagement with the door lug 18. If the car should move back past the tripper T, then the inclined surfaces 56 will assist the trip arm in riding upwardly over the projection P with a motion the same as in Fig. 6, and without in any way affecting the hook 20.

In certain instances it may be desirable, where a car is carrying rock or timber, to prevent latch operation as it moves past the tripper. This may be accomplished, as shown in Figs. 1 and 2, through the use of a U-shaped hanger 61 carried beneath the sloping wings, or by means of a spring clip 62 (Fig. 4), or by a permanent magnet 63 (Fig. 5). Any of these devices will permit pre-selection of the cars to be dumped at the designated dumping station. In other words the train of cars may be made up in the mine and moved past the tripper with only those cars dropping the doors on which the trip lever 52 is projecting beyond the clearances of the car.

In certain operations where considerable rock or coal falls along the track, it may be desirable to permit the trip lever added freedom of movement with respect to the rock shaft. This may be accomplished by substituting a ball and socket connection, as shown in Fig. 11, for the pin connection shown in Fig. 3. In this form the U-shaped member is modified by having the side flanges 64 inclined upwardly and outwardly with respect to the web, so that the trip arm may move longitudinally of the car with a lifting motion imparted by the inclined flanges. As shown, the rock shaft 40 is provided with a ball projection 65, and this is adapted to be engaged by socket 66 formed in the trip lever. In order that the lever may be assembled on the ball, it is split, with the split portion adapted to be riveted or otherwise secured to the lever by a rivet, such as 68. The shape of this trip lever is the same as that described in Fig. 3, and its operation will be the same, except that it may yield longitudinally of the car, as well as vertically, but like the form shown in Fig. 3, the trip lever will be rigid with the rock shaft upon application of downward pressure by the projection P.

Referring now to Figs. 7 and 8, it will be seen that the rock shaft 70 extends longitudinally of the car outwardly of the sill, but beneath the side wing portions substantially in a vertical plane through the wheel. In this form the rock shaft is formed with a downwardly and outwardly projecting trip lever 72 adapted to engage a tripping projection P. The rear end of the rock shaft is provided with an upstanding bell crank 73, the upper end of which is pin connected to a pull rod 74. This rod extends through a light spring 75 bearing at one end on rod-carried stop 76 and at the other end upon the end wall-carried gusset 77. The inner end of the pull rod is slotted, as at 78, to give a lost motion connection with pin 79 carried on the upper end of hook 20. The hook is urged toward door engaging position by a relatively heavy spring 80 attached to the hook supporting structure 24. The door engaging movement of the hook is limited by stop 81 welded or otherwise secured to the support and preventing excessive clockwise rotation of the hook about its supporting pivot 22. From the preceding it will be seen that the hook is normally held in door engaging position by the relatively heavy spring 80, which is much stronger than the light spring 75 normally holding the trip lever 72 in its down or operative position. When the lever 72 strikes a trackside obstruction such as a rock, it will freely ride over the same by compressing light spring 75 and pushing the rod 74 inwardly, but this will have no effect on the hook since slot 78 can freely ride over pin 79.

In the form shown in Figs. 9 and 10, the mounting of the rock shaft 70 and its parts is identical with that shown in Figs. 7 and 8, and accordingly, the same reference numerals have been applied wherever possible. In this form the pull rod 74 is provided with a stop 82 projecting upwardly therefrom adjacent its inner end, while the hook is provided with an upward extension 84 carrying a pin 86 adapted to slide in the upper end of stop 82. A spring 88 surrounds the pin 86 and has one end bearing on stop 82 and the other end bearing upon the upper end of hook extension 84. By this arrangement the single spring 88 serves the same function as the springs 75 and 80 of the form shown in Figs. 7 and 8. In other words, if the lever extension 72 strikes a rock or other trackside obstruction, the rod 74 will move inwardly of the car compressing spring 88 and causing the slot 78 to ride along pin 79 without in any way affecting the hook engagement. Upon downward movement of the lever arm by projection P, the rod 74 will directly pull on pin 79, causing the hook to rotate in a counterclockwise direction, releasing the door for dropping. Here again the spring 88 will be compressed, since the upper end of the extension 84 will move approximately twice as fast toward the stop 82 as the stop moves away from the projection. Since certain of the latch mechanism in the form shown in Figs. 7 to 10 might be injured by falling coal or rock, a deflector plate 90 is welded or otherwise secured to the end wall above the end-carried mechanism.

From the preceding description of the various modifications it will be seen that the latch mechanisms each include a lost motion connection between the trip lever and the door engaging hook. It will be seen that this lost motion yields in the direction that pressure could be exerted by any trackside obstruction such as rock or coal which has fallen adjacent the track. Each of the mechanisms can only function to operate the latch when pressure is directed downwardly by a specially designed trackside tripper. In other words, it becomes impossible for what might be termed a normal or natural trackside obstruction such as a rock to trip the latch, since such an obstruction could not exert a downward pressure. Also, it will be seen that in each case the tripping lever is further protected by being located adjacent a wheel, so that the car structure, regardless of direction of car travel, will normally clear trackside obstructions before they could strike the trip lever 52 or 72. This locating of the trip levers adjacent the wheel also places them in a location where weaving or wear of car parts, such as flanges and journal boxes, will have a minimum effect on the cooperation of the trip lever with the tripping projection P.

While the invention has been described more or less in detail with specific reference to the various modifications, it will be obvious that various other modifications and rearrangements of parts may be made without departing from the scope of the invention as defined by the following claims.

What is claimed is:

1. In a drop bottom car supported by wheels and having load supporting side sill members joined by end sills, a drop bottom door hingedly carried by the car, a latch assembly carried by the car and comprising a latch hook normally engaging the door to retain the same in raised position and movable to release the door for opening, latch hook operating means connected to said latch hook and including a trip lever extending to one side of the car and movable downwardly to release said latch hook from engagement with the door for opening.

2. In a drop bottom car supported by wheels and having load supporting side sill members joined by end sills, a drop bottom door hingedly carried by the car, a latch assembly carried by the car and comprising a latch hook normally engaging the door to retain the same in raised position and movable to release the door for opening, latch hook operating means connected to said latch hook and including a trip lever extending to one side of the car and movable downwardly to release said latch hook from engagement with the door for opening, said operating means also including a lost motion connection whereby upward motion of said trip lever is not transmitted to said latch hook.

3. In a drop bottom car supported by wheels and having load supporting side sill members joined by end sills, a drop bottom door hingedly carried by the car, a latch assembly carried by the car and comprising a latch hook normally engaging the door to retain the same in raised position and movable to release the door for opening, latch hook operating means connected to said latch hook and including a trip lever extending to one side of the car and movable downwardly to release said latch hook from engagement with the door for opening, said trip lever being pivotally connected to the remainder of said operating means and swingable upwardly relative thereto.

4. In a drop bottom car supported by wheels and having load supporting side sill members joined by end sills, a drop bottom door hingedly carried by the car, a latch assembly carried by the car and comprising a latch hook normally engaging the door to retain the same in raised position and movable to release the door for opening, latch hook operating means connected to said latch hook and including a trip lever extending to one side of the car and movable downwardly to release said latch hook from engagement with the door for opening, said trip lever having a ball and socket connection to the remainder of said operating means and swingable horizontally and upwardly relative thereto.

5. In a drop bottom car supported by wheels and having load supporting side sill members joined by end sills, a drop bottom door hingedly carried by the car, a latch hook carried adjacent the end sill and normally engaging the door to retain the same in raised position and movable to release the door for opening, means connected to said hook and extending transversely of the car toward one side thereof, means connected to said means and extending longitudinally of the car between the longitudinally extending vertical planes through the outer edges of the wheels and being protected by the wheels, and a trip lever connected to said longitudinally extending means and movable downwardly to release said latch hook from engagement with the door.

6. The structure of claim 5 characterized in that said first-named transversely extending means includes a lost motion connection to said latch hook whereby said trip lever may move upwardly without effecting movement of said latch hook.

7. The structure of claim 5 characterized in that said trip lever is pivotally connected to said second-named longitudinally extending means for independent upward swinging movement relative thereto.

8. The structure of claim 5 characterized in that said trip lever is pivotally connected to said second-named longitudinally extending means for independent longitudinal and upward swinging movement relative thereto and to the car.

9. The structure of claim 5 characterized in that said first-named transversely extending means includes a slot and pin connection whereby said trip lever may move upwardly without imparting motion to said latch hook.

10. In a drop bottom car supported by wheels and having load supporting side sill members joined by end sills, a drop bottom door hingedly carried by the car, a latch hook carried adjacent the end sill and normally engaging the door to retain the same in raised position and movable to release the door for opening, means connected to said hook and extending transversely of the car toward one side thereof, means connected to said means and extending longitudinally along said one side of the car inwardly of the outer edges of the wheels on that side of the car, a trip lever pivotally connected to said longitudinally extending means and swingable upward relative thereto to an inoperative position and movable downward from its operative position to release said latch hook from engagement with the door, and means to retain said trip lever in said upwardly swung inoperative position.

11. In a drop bottom car supported by wheels and having load supporting side sill members joined by end sills, a drop bottom door hingedly carried by the car, a latch hook carried adjacent the end sill and normally engaging the door to retain the same in raised position and movable to release the door for opening, means connected to said hook and extending transversely of the car toward one side thereof, means connected to said means and extending longitudinally of the car toward a wheel, a trip lever pivotally connected to said longitudinally extending means and swingable upward relative thereto to an inoperative position and movable downward from its operative position to release said latch hook from engagement with the door, and means to retain said trip lever in said upwardly swung inoperative position, said last-named means automatically engaging said trip lever upon upward swinging movement thereof.

12. In a drop bottom car supported by wheels and having load supporting side sill members joined by end sills, a drop bottom door hingedly carried by the car, a latch hook carried adjacent the end sill and normally engaging the door to retain the same in raised position and movable to release the door for opening, means connected to said hook and extending transversely of the car toward one side thereof, a rock shaft connected to said means and extending longitudinally of the car alongside one of said side sills, a generally U-shaped member secured to said rock shaft and extending outwardly therefrom, laterally of the car, and a trip lever pivoted between the upstanding arms of said U-shaped member and swingable upwardly relative thereto.

13. The structure of claim 12 characterized in that the upstanding arms of said U-shaped member diverge upwardly longitudinally of the car and the trip lever is pivoted thereto to swing both longitudinally and upwardly relative to the car.

14. In a drop bottom car supported by wheels and having load supporting side sill members formed with outstanding bottom flanges and vertical legs joined by end sills, side walls extending upwardly and outwardly from said side sills, a drop bottom door hingedly carried by the car, a latch hook carried by the car adjacent an end sill and normally engaging the door to retain the same in raised position and movable to release the door for opening, a rock shaft pivotally carried by one of the side sills in the corner formed by the outstanding bottom flange and vertical leg, means connecting said rock shaft and hook, and a trip lever pivotally connected to said rock shaft for upward swinging movement relative thereto.

15. The structure of claim 14 characterized in that said means includes means to independently adjust the position of said latch hook and trip lever.

16. In a drop bottom car supported by wheels and having load supporting side sill members formed with outstanding bottom flanges and vertical legs joined by end sills, side walls extending upwardly and outwardly from said side sills, a drop bottom door hingedly carried by the car, a latch hook carried by the car adjacent an end sill and normally engaging the door to retain the same in raised position and movable to release the door for opening, a rock shaft pivotally carried by one of the side sills in the corner formed by the outstanding bottom flange and vertical leg, means connecting said rock shaft and hook, and a trip lever pivotally connected to said rock shaft for upward swinging movement relative thereto, said trip lever being engageable with means carried by the car beneath a side wall to retain the trip lever in an inoperative position within the confines of the car structure.

17. In a drop bottom car supported by wheels and having load supporting side sill members formed with outstanding bottom flanges and vertical legs joined by end sills, side walls extending upwardly and outwardly from said side sills, a drop bottom door hingedly carried by the car, a latch hook carried by the car adjacent an end sill and normally engaging the door to retain the same in raised position and movable to release the door for opening, a rock shaft pivotally carried by the car beneath a side wall, means connecting said rock shaft and latch hook, and a trip lever connected to said rock shaft and extending outwardly and downwardly therefrom adjacent a wheel.

18. The structure of claim 17 characterized in that said means includes a lost motion connection allowing free upward movement of said trip lever relative to said car without effecting movement of said latch hook.

19. In a drop bottom car supported by wheels and having load supporting side sill members formed with outstanding bottom flanges and vertical legs joined by end sills, side walls extending upwardly and outwardly from said side sills, a drop bottom door hingedly carried by the car, a latch hook carried by the car adjacent an end sill and normally engaging the door to retain the same in raised position and movable to release the door for opening, a rock shaft pivotally carried by the car beneath a side wall and substantially in the longitudinal vertical plane of the wheels at that side of the car, means connecting said rock shaft and latch hook for joint operation in one direction, and a trip lever connected to said rock shaft and movable downwardly by a trackside device to release said latch hook from the door.

20. The structure of claim 19 characterized in that said means includes a pin and slot connection whereby said rock shaft and hook may move independently of each other in the other direction.

References Cited in the file of this patent

UNITED STATES PATENTS

| Number | Name | Date |
|---|---|---|
| 1,816,279 | Curzon | July 28, 1931 |